(12) United States Patent
Lee

(10) Patent No.: US 9,440,529 B2
(45) Date of Patent: Sep. 13, 2016

(54) CONFORMABLE FUEL GAS TANK

(71) Applicant: Alternative Fuel Containers, LLC, Southfield, MI (US)

(72) Inventor: Joong-Kyu Lee, Chatham (CA)

(73) Assignee: Alternative Fuel Containers, LLC, Southfield, MI (US)

( * ) Notice: Subject to any disclaimer, the term of this patent is extended or adjusted under 35 U.S.C. 154(b) by 0 days.

(21) Appl. No.: 14/909,288

(22) PCT Filed: Aug. 2, 2014

(86) PCT No.: PCT/US2014/049506
§ 371 (c)(1),
(2) Date: Feb. 1, 2016

(87) PCT Pub. No.: WO2015/017844
PCT Pub. Date: Feb. 5, 2015

(65) Prior Publication Data
US 2016/0185210 A1    Jun. 30, 2016

Related U.S. Application Data

(60) Provisional application No. 61/861,467, filed on Aug. 2, 2013, provisional application No. 61/868,271, filed on Aug. 21, 2013.

(51) Int. Cl.
| | | |
|---|---|---|
| *B60K 3/02* | (2006.01) | |
| *B60K 15/03* | (2006.01) | |
| *B60K 15/04* | (2006.01) | |
| *B60K 15/01* | (2006.01) | |

(52) U.S. Cl.
CPC ....... *B60K 15/03006* (2013.01); *B60K 15/013* (2013.01); *B60K 15/04* (2013.01); *B60K 2015/03236* (2013.01); *B60K 2015/03322* (2013.01); *B60K 2015/03328* (2013.01)

(58) Field of Classification Search
CPC ...... B60K 3/02; B60K 3/006; B60K 15/013; B60K 15/04; B60K 2015/08358
See application file for complete search history.

(56) References Cited

U.S. PATENT DOCUMENTS

| | | | | |
|---|---|---|---|---|
| 7,947,119 B2* | 5/2011 | Golz | ..................... | C01B 3/0005 206/7 |
| 2006/0051638 A1* | 3/2006 | Gross | ................... | C01B 3/0005 429/421 |
| 2007/0154757 A1* | 7/2007 | Okazaki | .................. | B60K 1/04 429/438 |
| 2009/0229555 A1* | 9/2009 | Ginzburg | ........... | B01D 53/0407 123/1 A |
| 2010/0326992 A1* | 12/2010 | De Rango | ............. | C01B 3/0005 220/581 |

OTHER PUBLICATIONS

Search Report and Written Opinion of the International Searching Authority (ISA/KR) for PCT/US2014/049506 dated Nov. 18, 2014.

* cited by examiner

*Primary Examiner* — John Walters
*Assistant Examiner* — James Triggs
(74) *Attorney, Agent, or Firm* — Reising Ethington P.C.

(57) ABSTRACT

A conformable fuel gas storage tank includes a housing that has exterior walls surrounding an interior. First and second base walls are spaced apart in a direction along a normal axis, side walls extend between the base walls and are spaced apart in a direction along a lateral axis, and end walls extend between the base walls and the side walls and are spaced apart in a direction along a longitudinal axis. Interior walls divide the interior and extend in a direction between the base walls and the end walls, and are spaced apart in a direction along the lateral axis. The interior walls establish elongate, laterally spaced, through channels extending longitudinally between the end walls. A gas storage material is located within the channels, and a gas permeable flow guide ex tends along at least one of the channels and through the gas storage material.

22 Claims, 6 Drawing Sheets

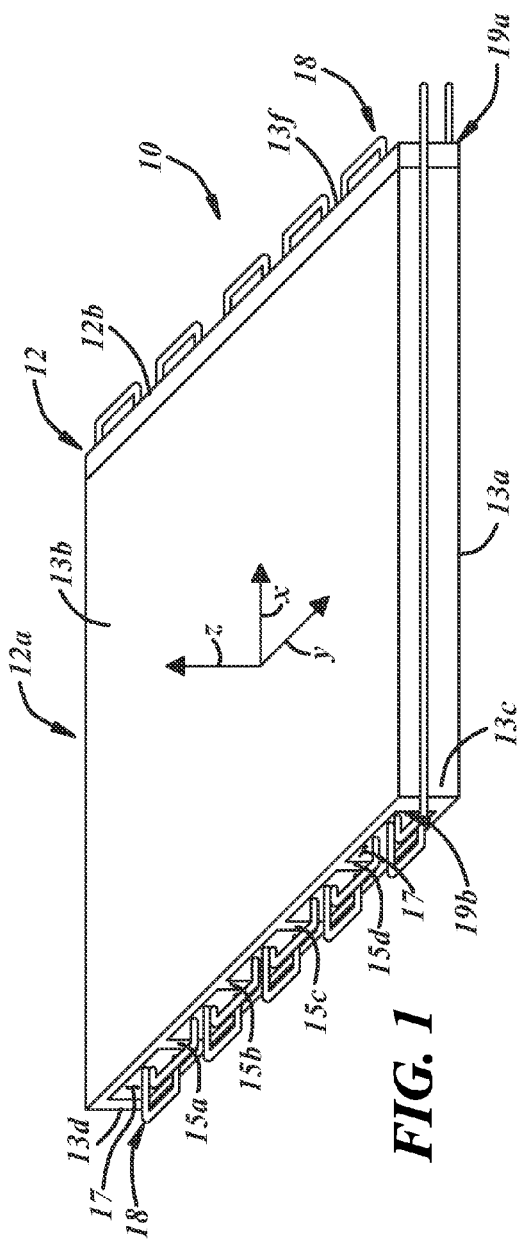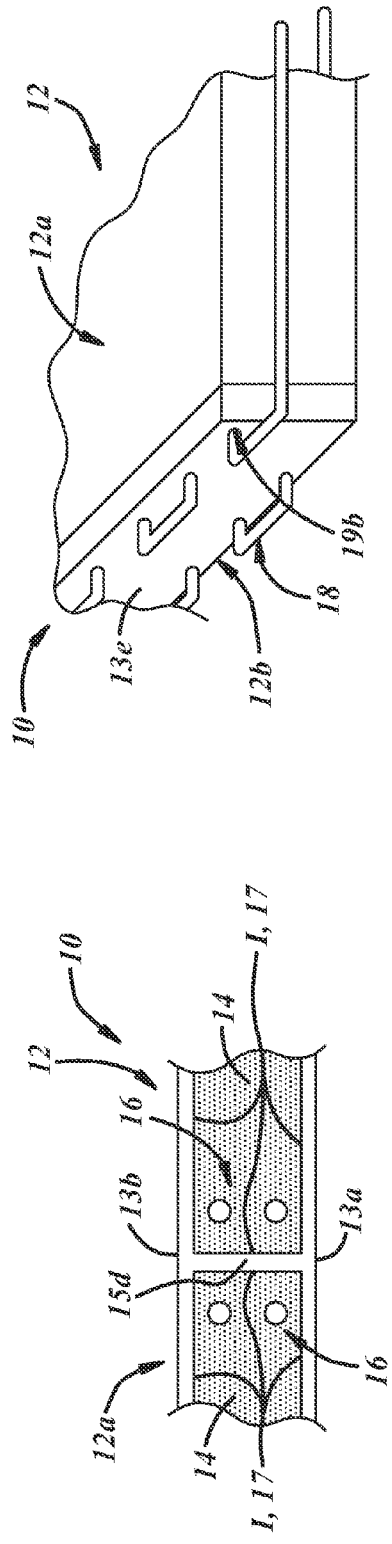

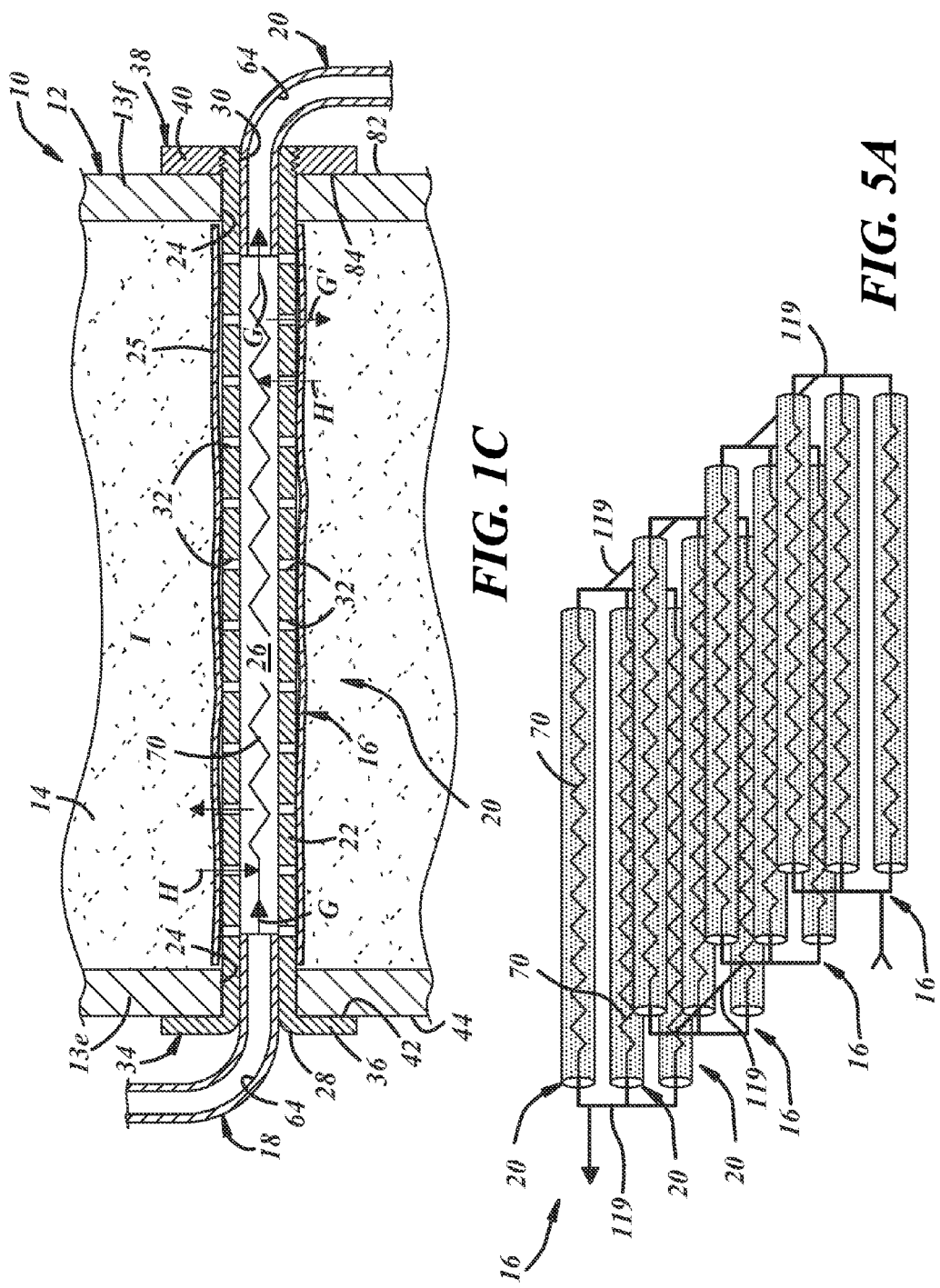

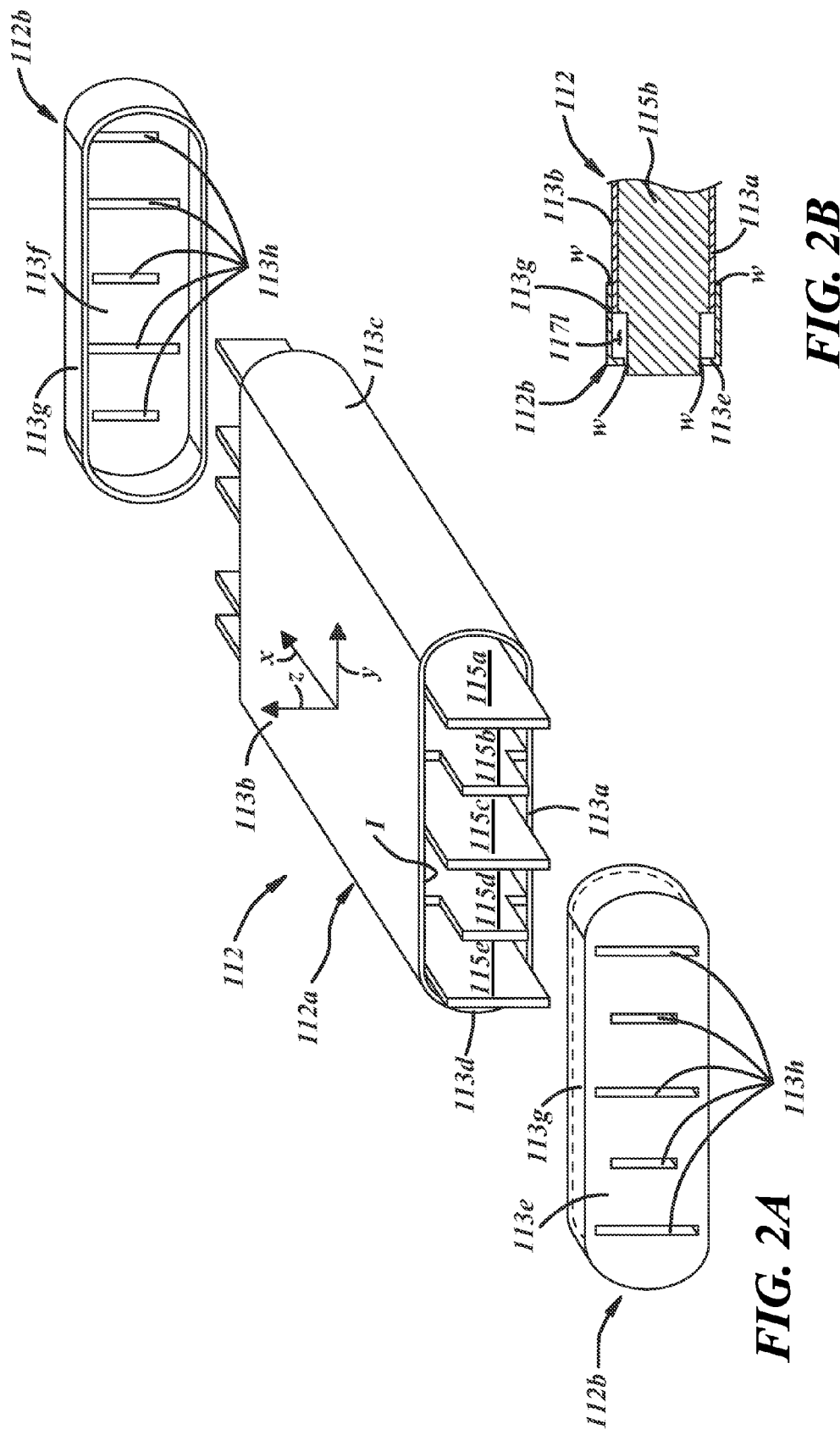

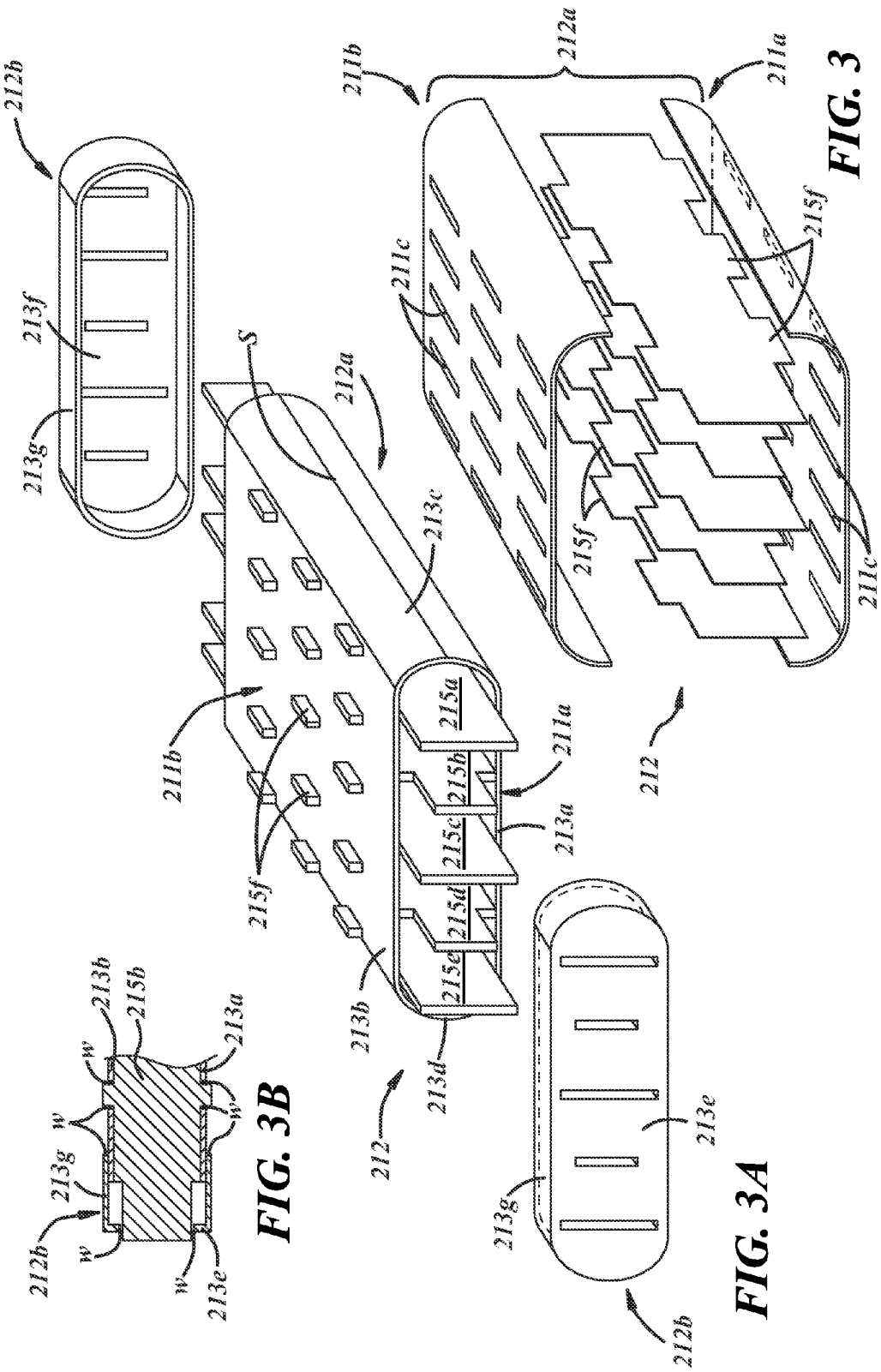

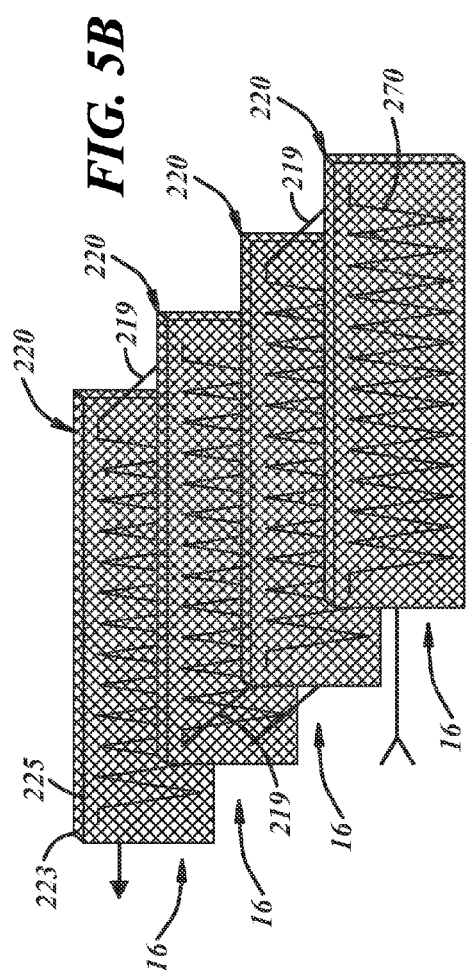
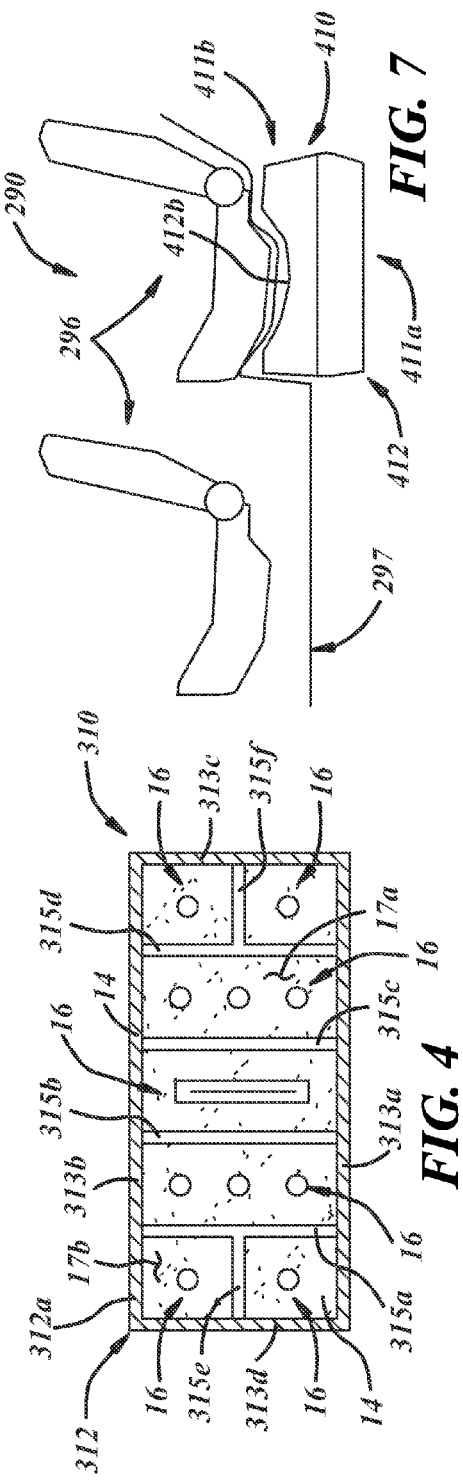

CONFORMABLE FUEL GAS TANK

CROSS-REFERENCE TO RELATED APPLICATIONS

This application claims priority to U.S. Provisional Application No. 61/861,467 filed on Aug. 2, 2013 and U.S. Provisional Application No. 61/868,271 filed on Aug. 21, 2013.

TECHNICAL FIELD

The technical field of this disclosure relates generally to fuel gas storage tanks and, more particularly, to fuel gas storage tanks that include a gas storage material to augment gas storage capacity.

BACKGROUND

The use of alternative fuel gasses as a fuel source for motor vehicle applications is gaining commercial traction. Natural gas, for example, is comprised primarily of methane ($CH_4$) and, currently, can be combustibly consumed to power dedicated natural gas vehicles, which are fueled only by natural gas, or dual-fuel vehicles that are fueled by a combination of traditional petrol-based fuels and natural gas through separate fueling systems. Natural gas may be stored in an on-board fuel storage tank in two plausible ways: as compressed natural gas (CNG) or adsorbed natural gas (ANG). Compressed natural gas is natural gas that is contained within a tank—usually a cylindrical or spherical tank—at less than 1% of the volume it would normally occupy at standard temperature and pressure (STP). Tank pressures of 150 bar to 250 bar are typically needed to achieve this level of compression.

Adsorbed natural gas is natural gas that is adsorbed onto a natural gas storage material housed within a tank. The natural gas storage material increases the volumetric and gravimetric energy density of the gas within the available tank space such that it compares favorably to CNG but at a much lower pressure of 60 bar or less. Several different kinds of natural gas storage materials are known in the art including activated carbon and, more recently, metal-organic-frameworks (MOFs) that have an affinity for natural gas. MOFs, in general, are high surface area coordination polymers having an inorganic-organic framework, often a three-dimensional network, that includes metal ions (or clusters) bound by organic ligands. Many different types of MOFs that are able to reversibly adsorb natural gas are commercially available in the marketplace and newly-identified MOFs are constantly being researched and developed.

Another type of alternative fuel gas is hydrogen, which, like natural gas, can also be stored in a compressed state or on a hydrogen storage material. Storing hydrogen gas on a hydrogen storage material has similar thermodynamics to storing natural gas on an ANG storage material even though hydrogen uptake is chemical in nature—hydrogen is stored as a hydride—as opposed to adsorptive. Hydrogen gas, for instance, can be reversibly charged and released from a hydrogen storage material such as, for example, a complex metal hydride including various known alanates, borohydrides, and amides. Some specific complex metal hydrides include sodium alanate ($NaAlH_4$), lithium alanate ($LiAlH_4$), lithium borohydride ($LiBH_4$) with or without $MgH_2$, calcium borohydride ($CaBH_4$) with or without $MgH_2$, and lithium amide ($LiNH_2$). MOFs and PPNs may also be used to store hydrogen gas. There are, of course, many other hydrogen storage materials that are commercially available.

A design consideration that factors into the commercial demand and viability of on-board fuel gas storage tanks that utilize a gas storage material—and all vehicle fuel tanks for that matter—is "conformability." The concept of tank conformability relates to the flexibility of the tank structure and how easily it can be adapted to fit the available packing requirements across many different vehicle platforms. Cylindrical and spherical tanks, for example, which are used to store compressed fuel gas due to the high pressures involved, are generally considered to be quite non-conformable since they are typically unable to efficiently occupy the dedicated fuel tank space that vehicle manufacturers make available. And while storage tanks that include a gas storage material do not have to accommodate the pressures typically found in compressed fuel gas applications, the internal pressure range they must be equipped to handle is still high enough that provisions are often needed to provide structural integrity to the tank if tank shapes other than cylindrical and spherical are desired.

To this end, there exists a need for a fuel gas storage tank that not only stores a sufficient quantity of fuel gas to enable acceptable driving distances between fill-ups, but is also amenable to quick re-filling times, all the while being conformable to many different types of vehicle platforms. A fuel gas storage tank that possesses such attributes would simplify the integration of fuel gas such as natural gas and hydrogen gas into motor vehicles—especially passenger cars and trucks—as a source of power for operating and propelling the vehicle either alone or in combination with other power sources such as, for example, traditional petrol-based fuels (e.g., gasoline or diesel fuel) and lithium ion batteries. And, practically speaking, the flexibility and design freedom to customize the size and shape of the fuel gas storage tank to fit individual vehicle packaging requirements would also make fuel gas technologies a more economically attractive option for motor vehicle applications.

SUMMARY

An illustrative embodiment of a conformable fuel gas storage tank for storing fuel gasses such as natural gas and hydrogen includes a housing establishing an interior for containment of the fuel gas. The housing has exterior walls surrounding the interior and interior walls dividing the interior. The exterior walls include first and second base walls spaced apart in a direction along a normal axis, side walls extending between the base walls and spaced apart in a direction along a lateral axis, and end walls extending between the base walls and the side walls and spaced apart in a direction along a longitudinal axis. The interior walls extend in a direction between the base walls and the end walls and are spaced apart in a direction along the lateral axis. The interior and exterior walls establish elongate through channels spaced laterally apart and extending longitudinally between the end walls. The tank also includes a gas storage material located within the channels, and a gas permeable flow guide extending along at least one of the channels and through the gas storage material.

BRIEF DESCRIPTION OF THE DRAWINGS

FIG. 1 is an exploded, schematic, perspective view of an embodiment of a conformable fuel gas storage tank, illustrated with a housing and only one of two end caps, and a gas transport conduit including gas permeable flow guides for guiding a flow of fuel gas;

FIG. 1A is an enlarged, schematic sectional view of a portion of the fuel gas storage tank of FIG. 1, illustrating gas permeable flow guides extending through longitudinally extending channels of the tank;

FIG. 1B is an enlarged fragmentary view of the fuel gas storage tank of FIG. 1, illustrated with an end cap coupled to the housing;

FIG. 1C is a schematic sectional view of the fuel gas storage tank of FIG. 1, illustrating one of the gas permeable flow guides, in the form of a filter tube, extending through the housing;

FIG. 2A is a perspective view of a further embodiment of a conformable fuel gas storage tank;

FIG. 2B is an enlarged fragmentary sectional view an end cap of the fuel gas storage tank of FIG. 2A assembled and welded to a main body of the tank of FIG. 2A;

FIG. 3 is an exploded perspective view of another embodiment of a conformable fuel gas storage tank;

FIG. 3A is a perspective view of the fuel gas storage tank of FIG. 3, illustrated in an assembled and welded state;

FIG. 3B is an enlarged fragmentary sectional view an end cap of the fuel gas storage tank of FIG. 3A assembled and welded to a main body of the tank of FIG. 3A;

FIG. 4 is a schematic cross-sectional view of an additional embodiment of a conformable fuel gas storage tank, illustrating various different types of gas permeable flow guides;

FIG. 5A is a schematic perspective view of another embodiment of a gas permeable flow guide for guiding a flow of fuel gas;

FIG. 5B is a schematic perspective view of another embodiment of a gas permeable flow guide for guiding a flow of fuel gas;

FIG. 7 is a schematic side view of an embodiment of a vehicle having a conformable fuel gas storage tank, located under a vehicle floorboard.

DETAILED DESCRIPTION

Figure 6A:
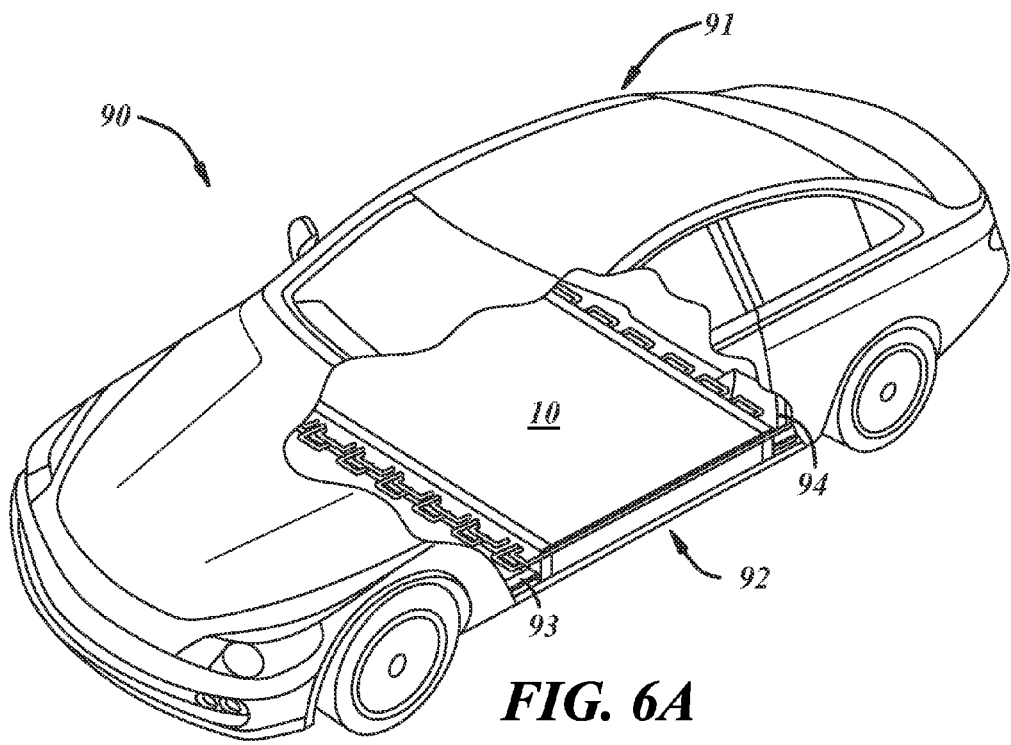
FIG. 6A is an embodiment of a vehicle including a conformable fuel gas storage tank integrated with a frame of the vehicle, located under a passenger compartment of the vehicle.

The conformable fuel gas tank detailed in this description addresses challenges associated with storing fuel gas, such as natural gas or hydrogen gas, aboard a vehicle—namely, the sometimes demanding packaging and weight requirements specified for the tank. As will be described in more detail below, the tank is "conformable" in the sense that its shape is not limited to cylinders and spheres and, instead, its shape can include a plurality of substantially planar surfaces that better accommodate packaging and spacing needs in vehicle applications. The conformable fuel gas tank stores ANG or hydrogen, as a hydride, at a relatively low pressure, which allows greater design freedom with respect to the shape of the tank. The conformable fuel gas tank includes a gas storage material, which permits natural gas or hydrogen gas to be stored at an energy density that compares favorably to those gases when stored in a compressed state, but at a lower tank pressure.

FIGS. 1-1C illustrate an embodiment of a conformable fuel gas storage tank 10 that may be used to store and hold adsorbed natural gas or hydrogen gas aboard a vehicle. Natural gas, as is generally well known, is a combustible fuel whose largest constituent is methane ($CH_4$). The preferred type of natural gas used here is refined natural gas that includes 90 wt. % or greater, and preferably 95 wt. % or greater, methane with the remaining 5 wt. % or less typically being varying amounts of natural impurities—such as higher molecular weight alkanes, carbon dioxide, and nitrogen—and/or added impurities. Hydrogen gas is also well known, having the chemical formula $H_2$. The conformable fuel gas tank 10 can have different designs, constructions, and components depending upon the capacity, packaging, and weight specifications of the vehicle to which the tank 10 is equipped. In the embodiment depicted in FIGS. 1-1C, the conformable fuel gas tank 10 includes a housing 12, a fuel gas storage material 14 (FIGS. 1A, 1C), a plurality of gas permeable flow guides 16 (FIGS. 1A, 1C) that extend through the gas storage material 14 and guide fuel gas thereto, and non-permeable connectors 18 (FIGS. 1, 1B, 1C) connecting the gas permeable flow guides 16.

With various reference to FIGS. 1-1C, the housing 12 may include a main body 12a and end caps 12b (FIGS. 1, 1B) sealingly coupled to the housing main body 12a to establish an interior I (FIGS. 1A, 1C). The end caps 12b can be welded, or fastened with gaskets, to the main body 12a, or may otherwise be sealingly coupled to the main body 12a in any other suitable manner. The housing 12 includes an inlet 19a that may be provided in one of the end caps 12b and an outlet 19b (FIG. 1B) that may be provided in the same end cap 12b or, as shown, in the other end cap 12b.

The housing 12 has various exterior walls surrounding the interior I, and interior walls dividing the interior I for containment of the gas storage material 14 and, consequently, the desired fuel gas be it natural gas or hydrogen. The exterior walls include first and second base walls 13a, 13b spaced apart in a direction along a normal axis Z, side walls 13c, 13d extending between the base walls 13a, 13b and spaced apart in a direction along a lateral axis Y, and end walls 13e, 13f having a thickness and extending between the base walls 13a, 13b and the side walls 13c, 13d and spaced apart in a direction along a longitudinal axis X. The interior walls 15a-15d have a thickness and extend in a direction between the base walls 13a, 13b and the end walls 13e, 13f, and are spaced apart in a direction along the lateral axis Y. In the illustrated embodiment shown here, the main body 12a comprises the base walls 13a, 13b, the side walls 13c, 13d, and the interior walls 15a-15d, and the end caps 12b, 12c comprise the end walls 13e, 13f. The interior and exterior walls establish a plurality (five illustrated) of elongate through channels 17 spaced laterally apart and extending longitudinally between the end walls 13e, 13f and containing the gas storage material 14. The interior walls 15a-15d, moreover, provide structural reinforcement for the housing 12 and counteract the outwardly directed forces that result from the internal tank pressure that accompanies the storage of fuel gas such as natural gas and hydrogen gas on the gas storage material 14.

In contrast to prior spherical and cylindrical tank structures, the housing 12 may be of any suitable configuration and may include one or more substantially planar walls as well as walls that conform to irregularly shaped spaces in a vehicle. As used in this context, the terminology "substantially" may include provision for rounded edges and corners. Indeed, as shown here, the illustrated housing 12 has six substantially planar walls, and does not include any cylindrical or spherical walls. The housing walls intersect one another along edges that meet at corners. The edges and corners of the housing 12 may be rounded for improved resistance against bending stresses experienced at those regions of the housing 12 due to the pressure of the fuel gas held inside the tank 10, which typically ranges from about 35 bar to about 60 bar. The housing 12 may be of substantially oblong rectangular configuration.

Also, the housing 12 may be of a planar low-profile configuration, in contrast to prior spherical, cylindrical, and cube-shaped tank configurations. This configuration may include provision for some of the walls having non-planar portions. The side walls 13c, 13d and the end walls 13e, 13f are shorter than the base walls 13a, 13b. For example, the length, width, and height of the housing 12 may be 2 m, 1.6 m, and 10 cm, respectively. In other embodiments, the length may range from 2 m to 5 m including all ranges and subranges therebetween, the width may range from 1 m to 2 m including all ranges and subranges therebetween, and the height may range from 3 cm to 15 cm including all ranges and subranges therebetween. The planar low-profile configuration allows the housing 12 to assume any of a wide variety of shapes beyond the cylindrical, spherical, and cubic shapes that have typically been used for natural gas and hydrogen gas storage, and allows the tank 10 to be designed in a way that best conforms to the space allotted for the fuel gas storage tank 10 on a particular vehicle platform.

In the illustrated embodiment, the main body 12a is an extruded unitary component, but may be of any other suitable construction. Any suitable type of material can be used to make the housing 12, including metal, for example, stainless steel, aluminum alloy, or any other suitable metal. The construction of the housing 12, however, is not limited to metal constructions and can be made from plastic such as carbon-fiber reinforced nylon, or it can be made from some other material of suitable strength and durability.

With respect to FIGS. 1A and 1C, the gas storage material 14 is located within the interior I of the housing 12 and augments the volumetric and gravimetric fuel gas storage capacity of the conformable fuel gas storage tank 10. The gas storage material 14 preferably in powderized form and fully occupies the interior I of the housing 12 and is enveloped around portions of the gas permeable flow guides 16. The gas storage material 14 may, if employed with natural gas, be any material that can adsorb and release natural gas or, if employed with hydrogen gas, be any material that can chemically uptake hydrogen gas as a hydride and later release hydrogen gas. Suitable examples of natural gas and hydrogen gas storage materials have already been recited above and others are recited below. In preferred embodiments, however, the gas storage material 14 is a MOF that is configured to store natural gas or hydrogen, whichever is being stored.

Some specific examples of materials that can comprise some or all of the gas storage material 14, in the context of adsorbed natural gas, are activated carbon, metal-organic-frameworks (MOF), or porous polymer networks (PPN). Activated carbon is a carbonaceous substance, typically charcoal, that has been activated by known physical or chemical techniques to increase its porosity and surface area. A metal-organic-framework is coordinated polymer having an inorganic-organic framework in which metal ions (or clusters) are connected by organic ligands to provide a porous, and typically three-dimensional, molecular framework structure. A porous polymer network is a covalently-bonded organic or inorganic-organic interpenetrating polymer network that, like MOFs, provides a porous and typically three-dimensional molecular framework structure. Some notable MOFs and PPNs that may be used are disclosed in R. J. Kuppler et al., Potential Applications of Metal-Organic Frameworks, Coordination Chemistry Reviews 253 (2009) pp. 3042-66, D. Yuan et al., Highly Stable Porous Polymer Networks with Exceptionally High Gas-Uptake Capacities, Adv. Mater. 2011, vol. 23 pp. 3723-25, and W. Lu et al., Porous Polymer Networks: Synthesis, Porosity, and Applications in Gas Storage/Separation, Chem. Mater. 2010, 22, 5964-72. Of course, a wide variety of MOFs and PPNs are commercially available and suitable for use as the gas storage material 14, and many others are constantly being researched, developed, and brought to market.

The gas permeable flow guides 16 are fluidly connected by a suitable quantity of the non-permeable connectors 18, which extend outside of the housing 12, to fluidly connect all of the flow guides 16 and provide a gas transport conduit that makes multiple runs through the housing interior I. Together, the non-permeable connectors 18 and the gas permeable flow guides 16 direct fuel gas into the conformable fuel gas tank 10 through the inlet 19a, route the natural gas through the transport conduit back-and-forth through the interior I of the housing 12 for good exposure to all parts of the gas storage material 14, and out of the housing 12 through the outlet 19b and eventually downstream to other optional components of, for example, a closed-loop filling system.

The gas permeable flow guides 16 extend through the tank interior I and through the gas storage material 14 in the housing 12 for adequate delivery of fuel gas to all parts of the gas storage material 14. The gas permeable flow guides 16 are multi-functional in that they (1) transport or convey fuel gas through portions of the housing interior I via convection along a prevailing flow path established by the transport conduit, and (2) distribute or diffuse fuel gas (natural gas or hydrogen) in a direction away from the prevailing flow path from inside the gas permeable flow guides 16 to outside the flow guides 16. The gas permeable flow guides 16 may also enable transfer of heat H from outside the flow guides 16 to inside the flow guides 16. There can be any number of gas permeable flow guides 16 installed in the conformable fuel gas storage tank 10. The exact number of gas permeable flow guides 16 may depend on the shape and size of the tank 10. In the illustrated conformable fuel gas storage tank 10 shown here, for instance, at least one gas permeable flow guide 16 extends between the end walls 13e, 13f along each of the elongate through channels 17.

As illustrated, the gas permeable flow guides 16 may extend back and forth through the elongate through channels 17 in a serpentine manner, and one or more of the channels 17 may include a plurality of the flow guides 16. For instance, a first gas permeable flow guide 16 may extend from the inlet 19a at a first end of the housing 12 through a first one of the channels 17 to a second end of the housing 12, where the first flow guide 16 fluidly joins one of the non-permeable connectors 18 that, in turn, exits the housing 12. The non-permeable connector 18 may then reverse direction and reenter the housing 12 back into the first one of the channels 17. From there, the non-permeable connector 18 may fluidly join to a second gas permeable flow guide 16 that extends through the first one of the channels 17 from the second end back toward the first end. At this point, the second flow guide 16 may again fluidly join to another one of the non-permeable connectors 18, which exits the housing 12 and reverses direction only to reenter the housing 12 into an adjacent, second one of the channels 17. From there, the gas permeable flow guides 16 may continue to wend back and forth through the channels 17, from a first side of the housing 12 to a second side of the housing 12, and back again to the first side of the housing 12 and through the first channel 17 and out of the outlet 19b in one of the ends of the housing 12. In other words, a plurality of the gas permeable flow guides 16 may extend end-to-end back and forth multiple times, and may extend side-to-side and back again at least once. Accordingly, at least one of the channels 17 may include at least four of the gas permeable flow guides 16. Those of skill in the art will recognize that the example illustrated in the drawing figures is only one of many examples of routing the gas permeable flow guides 16 through the several elongate flow channels 17, and that any other suitable routing configuration and quantity of flow guides 16 may be used.

With reference to FIG. 1C, the illustrated gas permeable flow guides 16 may be filter tubes 20, only a single one of which is shown and described here, although it should be appreciated that each filter tube 20 may be similarly constructed. The filter tube 20 may include a structural wall 22 that defines a flow passage 26 for guiding a bulk flow of fuel gas G from an inlet 28 to an outlet 30 of each tube 20, and may include a membrane 25 carried by the structural wall 22. The bulk flow of fuel gas G can travel within and along the flow passage 26 without directly contacting the gas storage material 14 contained in the tank interior I. As the bulk flow of fuel gas G travels along the flow passage 26, the structural wall 22 and the membrane 25 together allow some fuel gas G' to diffuse from within the flow passage 26 to outside of the filter tube 20 where it can be adsorbed/uptaken by the gas storage material 14. The structural wall 22 and the membrane 25 also allow heat H that is generated by the exothermic adsorption/uptake of natural gas/hydrogen gas onto the gas storage material 14 to transfer from outside the filter tube 20 to inside the flow passage 26 of the filter tube 20 where it can be captured and carried away by the bulk flow of fuel gas G moving along and through the flow passage 26. The filter tube 20 may include additional materials or discrete layers besides the structural wall 22 and the membrane 25 or it may include the structural wall 22 alone if it can accommodate on its own the cross-flow of diffused fuel gas G' and heat H while excluding pieces of the gas storage material 14 from passing through the wall 22 and entering the flow passage 26.

The structural wall 22 of the filter tube 20 may be cylindrical in shape and provided with small holes 32 for the passage of some natural gas G' from the flow passage 26 through the wall 22. The holes 32 can be regularly and uniformly spaced perforations all along the structural wall 22, as shown. In other embodiments, the holes 32 may be defined by interrelated strands as would be found in a structural mesh, or the holes 32 may be provided in any other suitable manner. In some examples, the flow passage 26 can have a diameter ranging from about 3 mm to about 10 mm including all ranges and subranges therebetween, and the holes 32 can have a diameter ranging from about 10 μm to about 2 mm including all ranges and subranges therebetween. Still, in other examples, the flow passage 26 and the holes 32 could have diameters of different values. If the structural wall 22 is a mesh structure that defines holes 32 of less than 50 μm in diameter, for example, then the membrane 25 may not be needed as part of the filter tube 20. The structural wall 22 can be made of the same material as the housing 12, like the metal and plastic materials set forth above, or it could be composed of any other suitable material.

The membrane 25 carried by the structural wall 22 provides a finer filtration medium compared to the holes 32 in the structural wall 22. The membrane 25 is preferably a micro- or ultra-filtration material or film that is gas permeable so that the natural gas G' removed from the bulk gas G flow can diffuse through the membrane 25 and out of the filter tube 20 for adsorption/uptake by the gas storage material 14. A network of interconnected pores preferably traverses a thickness of the membrane 25, which typically ranges from about 20 μm to about 2 mm. While the pores are sized to allow diffusion of the fuel gas G' from the flow passage 26 of the filter tube 20 to the gas storage material 14 located outside of the filter tube 20, their size can also be tailored to prevent passage of the gas storage material 14 from outside the filter tube 20 into the flow passage 26. For instance, the pores of the membrane 25 may be sized to exclude the smallest anticipated particles of the gas storage material 14 that may result from fragmentation of the material 14—which can be caused over time by temperature, pressure, and fuel gas load cycling—from passing through the thickness of the membrane 25. An average pore size of about 10 μm to about 50 μm may be sufficient in such circumstances.

A number of micro- or ultra-filtration materials exist and are known in the art to be natural gas or hydrogen permeable. Of these many choices, the membrane 25 may be silica- or silicate-based desiccant material, which permits gas diffusion while, at the same time, operating to hydroscopically sorb water that may still be diffused in the fuel gas flow G traveling through the flow passage 26. The membrane 25 can be a hydrophilic zeolite, such as ZSM-5, or an organic polymer-based membrane. The membrane 25 can be carried by the structural wall 22 of the filter tube 20 in different ways. Referring to FIG. 1C, for example, the membrane 25 is overlapped around the outside of the structural wall 22. Here, the membrane 25 surrounds all sides of the structural wall 22 and spans longitudinally over the extent of the wall 22 exposed to the gas storage material 14. In another embodiment, the membrane 25 can be carried within the structural wall 22 on an inside surface of the wall 22 and within the flow passage 26, or it may be sandwiched between the structural wall 22 and another co-axial component of the filter tube 20. The membrane 25 can be appended to the structural wall 22 by any known technique.

The filter tubes 20 can be hermetically coupled at their ends to the end walls 13e, 13f of the housing 12 by different ways, techniques, components, and processes. The exact coupling may depend on the materials selected for the filter tubes 20 and the walls 13e, 13f. The term "coupling" as used herein does not necessarily mean a mechanical interconnection between components like a bolt and nut threaded together, though does mean this in some embodiments, and instead merely means direct or indirect abutment between components like surfaces kept in contact with each other. In the embodiment depicted in FIG. 1C, for instance, the filter tubes 20 may be rigidly coupled to the end walls 13e, 13f. As shown, each filter tube 20 has a first coupling 34 with a flange 36, and a second coupling 38 with a fitting 40. The flange 36 preferably has a circular shape that extends radially outwardly from a circumference of the structural wall 22. The flange 36 can be unitary with the structural wall 22 or it can a discrete piece attached to the wall 22 by welding, adhesion, a mechanical interlock, or some other way. The fitting 40 on the opposite end of the flow guide 16 is preferably a nut that has inner threads engaged with, and tightened down on, outer threads that are disposed on the exterior of the structural wall 22.

Each of the filter tubes 20 may be installed in the housing 12 by inserting its threaded end through an opening 24 in one of the end walls 13e, 13f, and then through another opening 24 in the other of the end walls 13e, 13f. An inner surface 42 of the flange 36 is seated against an outer surface 44 of its respective wall. Similarly, the nut 40 is tightened down on the outer threads of the structural wall 22 of the filter tube 20, which protrudes past an outer surface 82 of its respective end wall 13e, 13f, so that an inner surface of the nut 84 is seated against that outer wall surface 82. The engaged surfaces 42, 44 and 82, 84 therefore make surface-to-surface abutment in the embodiment of FIG. 1C. And, although not illustrated, one or more o-rings or other gaskets can be disposed against the outer shell surfaces 44, 82 to help seal the filter tube 20 and the housing 12. A cured epoxy sealant could also be disposed between the filter tube 20 and the housing 12 and/or one or more welds could be performed at the first and/or second couplings 34, 38 to help seal the filter tube 20 and the housing 12 and to further achieve a permanent fixation between the two components. If permanent fixing is not performed, and it does not necessarily have to be, the filter tubes 20 can be decoupled and uninstalled from the housing 12 if necessary. In this way, the filter tubes 20 can be serviced and repaired or replaced during the useful lifetime of the conformable fuel gas storage tank 10.

The non-permeable connectors 18 and other conduits that extend outside of the housing 12 are not able to outwardly diffuse fuel gas like the filter tubes 20 and, instead, have a solid body that defines a passage 64. Portions of two such connectors 18 are shown in FIG. 1C. The wall that makes up the solid body of the non-permeable connectors 18 can have a thickness that ranges from about 0.5 mm to about 1 mm, and it can provide the connectors 18 with a diameter to an outer surface that ranges from about 3 mm and about 10 mm. Of course other thickness and diameter values are possible. The non-permeable connectors 18 can be made from the same material as the structural wall 22 of the filter tubes 20 or they can be composed of a different material such as brass or some other suitable metal.

The non-permeable connectors 18 can extend through the end walls 13e, 13f and can be connected to the filter tubes 20 by different ways, techniques, components, and processes. The exact connection may depend on the materials selected for the non-permeable connectors 18 and filter tubes 20, among other factors. In the embodiment of FIG. 1C, for example, the non-permeable connectors 18 are connected to the filter tubes 20 by way of a press-fit in which the connectors 18 are inserted inside of the flow passages 26 of the structural walls 22 to an overlapping extent sufficient to maintain their connection and preclude gas leakage between the connectors 18 and tubes 20. To facilitate the press-fit, the inserted connector ends can be immersed in liquid nitrogen to temporarily physically shrink the ends before insertion into the flow passage 26 of the structural wall 22, followed by natural expansion of the connector ends, after insertion, as they heat back up to ambient temperature. Alternatively, the press-fit connection can be facilitated by spring-like structures disposed on the inserted connector ends of the non-permeable connectors 18 that are displaced inwardly upon insertion and that exert an outward force against the flow passage 26 of the structural wall 22. Yet in other embodiments the connection could include other components like additional fittings, parts, gaskets, seals, o-rings, washers, rivets, clamps, and combinations thereof. The connection could also be effectuated by processes like welding, adhesion, curing, staking, soldering, and combinations thereof.

A heating element 70 can be located at the filter tubes 20 in order to periodically emit heat to the tubes 20 upon activation. The heating element 70 can take different forms including a resistance wire, as shown in FIG. 1C, which can be made of fabric-insulated tungsten, un-insulated tungsten, or any other suitable material. The resistance wire 70 may be wound helically inside of the flow passage 26 and against an interior surface of the structural wall 22. Other arrangements are indeed possible, however, such as winding the wire 70 around the outside of the structural wall 22—preferably if the membrane 25 is carried on the inside of the structural wall 22—or winding the heating wire 70 within the structural wall 22. Moreover, the resistance wire 70 can be a single wire routed through all of the filter tubes 20 and through all of the non-permeable connectors 18 with a single electrical connection to a power source (not shown), or multiple resistance wires can be routed through the different filter tubes 20 with separate electrical connections to the power source.

The heat from the heating element 70, when emitted, may be used to degas the filter tubes 20, most notably the membrane 25, and to rid the surrounding gas storage material 14 of accumulated impurities such as water, carbon dioxide, hydrogen sulfide, lubricants, and other unwanted build-up that can be driven off at elevated temperatures above, for example, 150° C. Such degassing can be performed as needed to help ensure that the gas storage capacity of the gas storage material 14 is maintained. The degassing operation can be performed at periodic frequencies (e.g., annually) or during routine maintenance of the vehicle.

The gas permeable flow guides 16 may, of course, assume other constructions besides the filter tubes 20 shown in FIGS. 1 and 1B-1C. Additional illustrative examples of the gas permeable flow guides 16 are shown in FIGS. 5A and 5B. These embodiments are similar in many respects to the embodiments of FIGS. 1 and 1B-1C and, for that reason, like numerals between the embodiments generally designate like or corresponding elements throughout the several views of the drawing Figures. Accordingly, the descriptions of the embodiments are hereby incorporated into one another, and description of subject matter common to the embodiments generally will not be repeated.

In FIG. 5A, the gas permeable flow guides 16 include two or more (e.g., three, as illustrated) stacked filter tubes 20 for each elongate through channel 17. Each filter tube 20 may include a heating element 70, as previously described, and the stacked filter tubes 20 that constitute the flow guide 16 in each channel 17 provide parallel gas flow paths 26 (FIG. 1C) that communicate with a common connector 119. The connectors 119, in turn, are routed between adjacent stacks of filter tubes 20 within the interior I of the housing 12, for example through lateral flow channels 1171 shown in FIG. 2B and described below. In other words, unlike the fuel gas storage tank 12 shown in FIG. 1, the connectors 119 used here do not pass through the end walls 13e, 13f, which are provided by the end caps 12b that seal the main body 12a of the housing 12. The connectors 119, as such, may be either gas permeable or non-permeable, depending on their intended functionality. The use of connectors 119 that do not pass through the end walls 13e, 13f, as in FIG. 1, may be acceptable if the interior walls 15a-15d provide sufficient structural support to the housing 12 against the internal pressure attributed to the storage of fuel gas.

In FIG. 5B, the gas permeable flow guides 16 are rectangular filter slabs 220 that extend through the elongate through channels 17 defined in the interior I of the tank housing 12. Each of the rectangular filter slabs 220 includes an internal fabric 225 surrounded by a gas permeable cover 223 that maintains the shape of the filter slab 220. The cover 223 may be a gas permeable skin, such as a permeable heating fabric, which is commercially available from a variety of suppliers, or it may be a rigid frame such as perforated metal or expanded metal or mesh metal. The internal fabric 225 may any type of fiber-based material that allows convective bulk fuel gas flow and fuel gas diffusion. And, similar to before with respect to FIG. 5A, adjacent filter slabs 220 are fluidly coupled together by connectors 219 that are routed within the interior of the housing 12 through, for example, lateral flow channels 1171 as shown in FIG. 2B and described below. Each rectangular filter slab 220, moreover, may include a heating element 270 carried by one or both of the fabric 225 or the gas permeable cover 223.

FIGS. 2A-2B show another illustrative embodiment of a conformable fuel gas storage tank. This embodiment is similar in many respects to the embodiment of FIGS. 1-1C and, for that reason, like numerals between the embodiments generally designate like or corresponding elements throughout the several views of the drawing Figures. Accordingly, the descriptions of the embodiments are hereby incorporated into one another, and description of subject matter common to the embodiments generally will not be repeated.

With reference now to FIG. 2A, the conformable fuel gas storage tank includes a housing 112 that has a main body 112a and end caps 112b. The housing 112, like before, has various exterior walls 113a-113f that establish an interior I and interior walls 115a-115e that divide the interior I. The exterior walls 113a-113f include first and second base walls 113a, 113b spaced apart in a direction along a normal axis Z, side walls 113c, 113d extending between the base walls 113a, 113b and spaced apart in a direction along a lateral axis Y, and end walls 113e, 113f extending between the base walls 113a, 113b and the side walls 113c, 113d and spaced apart in a direction along a longitudinal axis X. In the illustrated embodiment, the main body 112a may be a cast unitary component, for instance, a die-cast component, a lost-foam-cast component, a sand-cast component, or the like. In another embodiment, although not explicitly shown here, the main body 112a may be cast to have an open end and a closed end. The closed end includes one of the end walls 113e, 113f integrated with the main body 112a while the open end is closed and sealed by an end cap 112b that provides the other end wall 113e, 113f.

With reference to FIG. 2B, the end caps 112b include the end walls 113e, 113f, and further include skirts 113g extending from a periphery of the end walls 113e, 113f. The end caps 112b are coupled to the main body 112a via welds W that may extend circumferentially around the ends of the skirts 113g. Additionally, the interior walls 115a-115e extend exteriorly beyond the side walls 113c, 113d and the base walls 113a, 113b and through corresponding apertures 113h defined in the end walls 113e, 113f. The longitudinal ends of the interior walls 115a-115e may be coupled to the end walls 113e, 113f via welds W. The various welds W may hermetically seal the housing 112 closed.

The interior walls 115a-115e may include longitudinal ends that are of different heights, for instance, alternating different heights, although they do not have to. More specifically, each of the interior walls 115a-115e may include opposite longitudinal ends that are of different heights. Instances of the interior walls 115a-115e having shorter ends may cooperate with the end caps 112b to establish lateral flow channels 1171 at the longitudinal ends of the housing 112. These lateral flow channels 1171 permit for cross conductive flow of fuel gas outside of the gas permeable flow guides 16 and, if desired, permit passage of connectors 119, 219 that, as described above, are routed between elongate through channels 17 without traversing an end wall 113e, 113f of the housing 112. Accordingly, the housing 112 may include the various interior walls 115a-115e to further promote serpentine flow of fuel gas back and forth through the housing 112 for good heat transfer.

FIGS. 3-3B show another illustrative embodiment of a conformable fuel gas storage tank. This embodiment is similar in many respects to the embodiment of FIGS. 1-2B and, for that reason, like numerals between the embodiments generally designate like or corresponding elements throughout the several views of the drawing Figures. Accordingly, the descriptions of the embodiments are hereby incorporated into one another, and description of subject matter common to the embodiments generally will not be repeated.

With reference to FIGS. 3 and 3A, the conformable fuel gas storage tank includes a housing 212 that has a main body 212a and end caps 212b. The housing 212, like before, has various exterior walls 213a-213f and interior walls 215a-215e. In the illustrated embodiment, the main body 212a may include a first shell 211a, a second shell 211b, and the interior walls 215a-215e assembled and coupled (e.g., by welding) between the upper and lower shells 211a, 211b. The shells 211a, 211b may include apertures 211c therein, and the interior walls 215a-215e may include retaining tabs 215f extending therefrom for insertion into the shell apertures 211c. The retaining tabs 215f are preferably welded on the outside surfaces of the first and second shells 211a, 211b since that is where welding procedures can be most readily and accessibly practiced.

The housing 212 may be assembled, for example, by first inserting one set of the retaining tabs 215f of the interior walls 215a-215e into and through the apertures 211c of one of the shells 211a, 211b, and then welding the retaining tabs 215f to that shell 211a, 211b. Next, the other shell 211a, 211b may be assembled to the interior walls 215a-215e such that an oppositely disposed set of the retaining tabs 215f are received into and through the apertures 211c of the other shell 211a, 211b, followed by welding of the retaining tabs 215f to the other shell 211a, 211b. Additionally, the shells 211a, 211b may be welded together along seams S at side walls 213c, 213d thereof to complete assembly of the main body 212a. Once the main body 212a is constructed, the end caps 212b, which include the end walls 213e, 213f and skirts 213g extending from a periphery of the end walls 213e, 231f, are coupled to the main body 212a via welds W (FIG. 3B) to enclose the housing interior I. The longitudinal ends of the interior walls 215a-215e are received by and through the end caps 212b, as previously described, and are hermetically sealed to the end walls 213e, 213f via welds W (FIG. 3B). Lateral flow channels may be established by the longitudinal ends of the interior walls 215a-215e, if desired, as previously described.

By employing the first shell 211a and the second shell 211b, which can be welded along seams S to construct part of the housing 212, a degree of design freedom exists for the overall construction of the housing 212. Specifically, the first shell 211a and the second shell 211b can be manufactured separately, each having different shapes and profiles, and then assembled together to best fit the packaging requirements that accompany a particular vehicle platform. For example, the first shell 211a may have a fairly consistent base shape suitable for a variety of vehicles, and the second shell 211b may have a three-dimensional profile that is more customized to a particular vehicle space, like the embodiment described below with respect to FIG. 7. In this way, the same first shell 211a may be used for several different vehicles while the second shell 211b is changed on a vehicle-to-vehicle basis. This ability to tailor the conformability of the housing 212 without necessarily having to redesign and manufacture the entirety of the housing 212 anew promotes simplicity and efficiency in a manufacturing setting.

FIG. 7 schematically illustrates a portion of an automotive passenger vehicle 290 including seats 296, a floorboard 297 under the seats 296, and a conformable fuel gas storage tank 410 situated under the floorboard 297. The fuel gas storage tank 410 shown here is similar in many respects to the embodiments of FIGS. 1-5 and, for that reason, like numerals between the embodiments generally designate like or corresponding elements throughout the several views of the drawing Figures. Accordingly, the descriptions of the embodiments are hereby incorporated into one another, and description of subject matter common to the embodiments generally will not be repeated.

The fuel gas storage tank 410 includes a housing 412 that has a lower shell 411a and an upper shell 411b coupled to the lower shell 411a. The upper shell 411b has a base wall 412b with a non-planar profile corresponding to a non-planar undersurface of the vehicle floorboard 297. The geometry of the tank 410 is thus conformable to the geometry of the vehicle 290 so as to optimize the use of whatever space is available in the vehicle 290 underneath the floorboard 297.

FIG. 4 shows another illustrative embodiment of a conformable fuel gas storage tank 310. This embodiment is similar in many respects to the embodiments of FIGS. 1-3B and, for that reason, like numerals between the embodiments generally designate like or corresponding elements throughout the several views of the drawing Figures. Accordingly, the descriptions of the embodiments are hereby incorporated into one another, and description of subject matter common to the embodiments generally will not be repeated.

The conformable fuel gas storage tank 310 includes a housing 312 and multiple different types of the gas permeable flow guides 16—examples of which have been described above—that extend within elongate through channels 17 inside the housing 312. The housing 312 includes a main body 312a having exterior walls including first and second base walls 313a, 313b and side walls 313c, 313d extending between the base walls 313a, 313b. End walls are omitted from FIG. 4 for clarity. The housing 312 also includes interior walls including first interior walls 315a-315d extending in a direction between the base walls 313a, 313b and second interior walls 315e-315f extending from outboard instances 315a, 315d of the first interior walls to the side walls 313c, 313d. The second interior walls 315e, 315f, as shown, are oriented perpendicular to the first interior walls 315a, 315d from which they extend. The interior and exterior walls establish elongate through channels 17a, 17b. The second interior walls 315e, 315f, moreover, provide strength to the housing 312 to resist side loading on the housing 312.

Figure 6B:
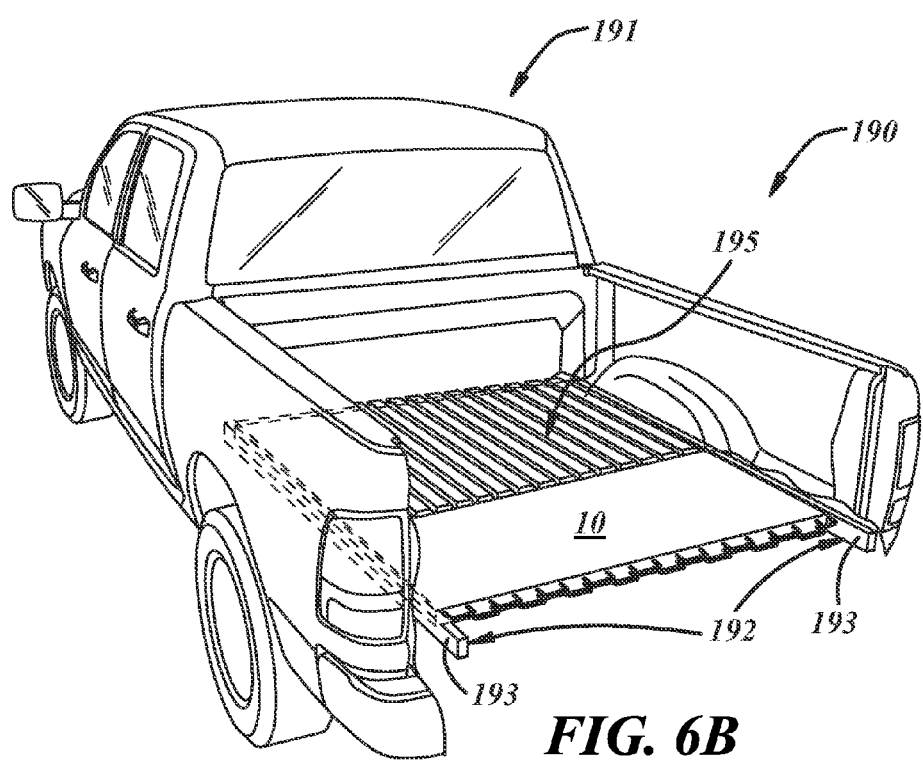
FIG. 6B is another embodiment of a vehicle including a conformable fuel gas storage tank integrated with a frame of the vehicle, located under a cargo bed of the vehicle.

The conformable fuel gas storage tanks described above may be supported on a vehicle as part of the vehicle frame. FIG. 6A illustrates an automotive vehicle 90, for instance, a passenger car, that includes a body 91 carried by a chassis 92. Any of the conformable fuel gas storage tanks described above—with the tank 10 of FIGS. 1-1C being shown in particular—may be deployed to constitute an integrated structural support portion of the chassis 92. Specifically, as shown, the chassis 92 may include a side member 93 and a B-pillar 94, and ends of the tank 10 may be welded to and between a portion of the side member 93 and a portion of the B-pillar 94. In this embodiment, the conformable fuel gas storage tank 10 is part of a vehicle floor portion of the chassis 92. Similarly, FIG. 6B illustrates an automotive vehicle 190, for instance, a passenger truck, that includes a body 191 carried by a chassis 192. Any of the conformable fuel gas storage tanks describe above—again, with the tank 10 of FIGS. 1-1C being shown in particular—may be deployed to constitute an integrated structural support portion of the chassis 192. Here, in this embodiment, the chassis 192 may include side rails 193, and sides of the fuel gas storage tank 10 may be welded to and between portions of the side rails 193 as an integrated cross-member of the chassis 192. The fuel gas storage tank 10 is thus part of a vehicle cargo bed portion of the chassis 192 and carries a cargo bed liner 195 thereon.

The above description of preferred illustrative embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A conformable fuel gas storage tank comprising:
a housing establishing an interior for containment of a fuel gas and having:
exterior walls surrounding the interior and including first and second base walls spaced apart in a direction along a normal axis, side walls extending between the base walls and spaced apart in a direction along a lateral axis, and end walls extending between the base walls and the side walls and spaced apart in a direction along a longitudinal axis, and
interior walls dividing the interior and extending in a direction between the base walls and the end walls and spaced apart in a direction along the lateral axis,
wherein the interior and exterior walls establish elongate through channels spaced laterally apart and extending longitudinally between the end walls;
a fuel gas storage material located within the elongate through channels; and
a gas permeable flow guide extending along at least one of the elongate through channels and through the gas storage material in that channel.

2. The conformable fuel gas storage tank set forth in claim 1, wherein the housing includes an inlet for a fuel gas transport conduit, which includes the gas permeable flow guide, and an outlet for the fuel gas transport conduit.

3. The conformable fuel gas storage tank set forth in claim 1, wherein at least one of the elongate through channels includes a plurality of gas permeable flow guides.

4. The conformable fuel gas storage tank set forth in claim 3, wherein the at least one of the elongate through channels includes at least four gas permeable flow guides.

5. The conformable fuel gas storage tank set forth in claim 1, wherein the gas permeable flow guide comprises two or more stacked filter tubes.

6. The conformable fuel gas storage tank set forth in claim 1, wherein the gas permeable flow guide comprises a rectangular filter slab that includes a fabric surrounded by a gas permeable cover.

7. The conformable fuel gas storage tank set forth in claim 1, wherein one or more gas permeable flow guides extends through each of the elongate through channels, the gas permeable flow guides being connected by connectors such that gas can flow through the gas permeable flow guides back and forth through the elongate through channels in a serpentine manner.

8. The conformable fuel gas storage tank set forth in claim 1, wherein the side walls and the end walls are shorter than the base walls.

9. The conformable fuel gas storage tank set forth in claim 1, wherein an end cap comprises at least one of the end walls, and wherein the interior walls extend longitudinally beyond the side walls and the base walls and through corresponding apertures in the end wall.

10. The conformable fuel gas storage tank set forth in claim 1, wherein a main body comprises the base walls, the side walls, and the interior walls, and end caps comprise the end walls, and wherein skirts extending from the end walls are coupled to the main body.

11. The conformable fuel gas storage tank set forth in claim 1, wherein a main body comprises the base walls, the side walls, and the interior walls, and wherein the main body is an extruded or die-cast unitary component.

12. The conformable fuel gas storage tank set forth in claim 1, wherein a main body comprises the base walls, the side walls, and the interior walls, and wherein the main body comprises an upper shell, a lower shell, and the interior walls assembled and coupled between the upper and lower shells.

13. The tank set forth in claim 1, wherein an end cap comprises at least one of the end walls, and the interior walls include longitudinal ends of different heights to cooperate with the end cap to establish lateral flow channels at the longitudinal ends of the tank housing for cross flow of fuel gas.

14. The tank set forth in claim 13, wherein the longitudinal ends are of alternating different heights to promote serpentine flow of fuel gas back and forth through the housing.

15. An automotive vehicle comprising:
a vehicle chassis; and
a conformable fuel gas storage tank as a structural support portion of the chassis, the fuel gas storage tank comprising:
   a housing establishing an interior, the housing including first and second base walls spaced apart in a direction along a normal axis, side walls extending between the base walls and spaced apart in a direction along a lateral axis, and end walls extending between the base walls and the side walls and spaced apart in a direction along a longitudinal axis, the housing further including interior walls that divide the interior into elongate through channels spaced laterally apart and extending longitudinally between the end walls;
   a fuel gas storage material located within the interior of the housing and in each of the elongate through channels; and
   a fuel gas transport conduit constructed to route a fuel gas back and forth through the interior of the housing between the end walls of the housing, the gas transport conduit comprising at least one gas permeable flow guide extending along each of the elongate through channels provided in the interior of the housing.

16. The vehicle set forth in claim 15, wherein the conformable fuel gas storage tank is part of a vehicle floor.

17. The vehicle set forth in claim 15, wherein the conformable fuel gas storage tank is part of a vehicle cargo bed.

18. The vehicle set forth in claim 15, wherein the main body comprises a lower shell and an upper shell, the upper shell being coupled to the lower shell and having a non-planar undulating profile corresponding to a non-planar undulating undersurface of a portion of the vehicle.

19. A conformable fuel gas storage tank comprising:
a housing establishing an interior, the housing including first and second base walls spaced apart in a direction along a normal axis, side walls extending between the base walls and spaced apart in a direction along a lateral axis, and end walls extending between the base walls and the side walls and spaced apart in a direction along a longitudinal axis, the housing further including interior walls that divide the interior into elongate through channels spaced laterally apart and extending longitudinally between the end walls, wherein a main body of the housing that includes the first and second base walls and the side walls is constructed from an upper shell and a lower shell that are coupled together along seems at the side walls, and wherein the interior walls include retaining tabs that are received through apertures defined in at least one of the upper or lower shell and are sealingly coupled to the at least one of the upper or lower shell;
a fuel gas storage material located within the interior of the housing and in each of the elongate through channels; and
a fuel gas transport conduit constructed to route a fuel gas back and forth through the interior of the housing between the end walls of the housing, the gas transport conduit comprising at least one gas permeable flow guide extending along each of the elongate through channels provided in the interior of the housing.

20. The conformable fuel gas storage tank set forth in claim 19, wherein the fuel gas storage material is a hydrogen storage material or a natural gas storage material.

21. The conformable fuel gas storage tank set forth in claim 19, wherein the gas permeable flow guide is a filter tube that comprises a structural wall, which defines a flow passage for guiding a bulk flow of fuel gas, and a membrane carried by the structural wall, the structural wall and the membrane permitting fuel gas to diffuse from inside the flow passage to outside of the filter tube.

22. The conformable fuel gas storage tank set forth in claim 19, wherein the fuel gas transport conduit comprises a plurality of gas permeable flow guides in each elongate through channel, and wherein each of the flow guides is a filter tube that comprises a structural wall, which defines a flow passage for guiding a bulk flow of fuel gas, and a membrane carried by the structural wall, the structural wall and the membrane permitting fuel gas to diffuse from inside the flow passage to outside of the filter tube, and wherein the gas transport conduit further comprises non-permeable connectors that extend through the end walls of the housing and connect the flow passages of the filter tubes so that fuel gas can be routed back and forth through the interior of the housing from an inlet to an outlet.

\* \* \* \* \*